Oct. 17, 1939.  F. BRAUNGART.  2,176,243
FLOW CONTROL MECHANISM
Filed April 4, 1938
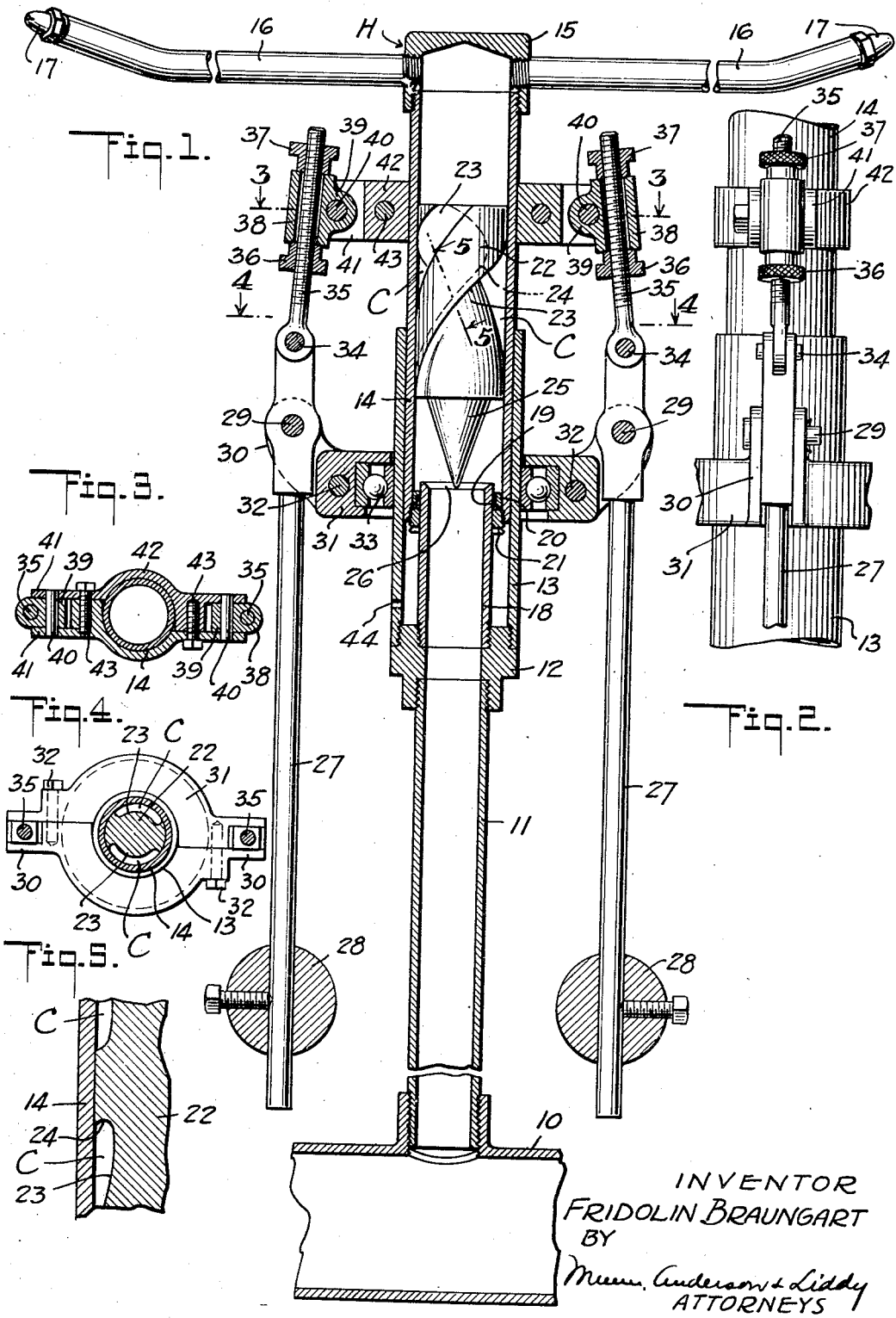
INVENTOR
FRIDOLIN BRAUNGART
BY
Munn, Anderson & Liddy
ATTORNEYS Patented Oct. 17, 1939

2,176,243

UNITED STATES PATENT OFFICE 2,176,243

FLOW CONTROL MECHANISM

Fridolin Braungart, Bakersfield, Calif.

Application April 4, 1938, Serial No. 199,865

11 Claims. (Cl. 299—69)

This invention relates generally to flow control mechanisms, and more particularly to devices for automatically regulating the quantity of fluid discharged from an outlet of a conduit.

An object of the invention is to provide a mechanism particularly adapted, although not necessarily, for use with overhead sprinkler irrigating systems, to discharge a predetermined uniform quantity of water from each of a multiplicity of outlets in the system, irrespective of the different distances of the outlets from the pressure pump of the system, whereby to automatically compensate for the pressure drop in the system from fluid friction and viscosity, and to thereby enable the part of the system most remote from the pump to deliver the requisite quantity of water for irrigation, as well as to prevent the waste of water from outlets near the pump.

Another object of the invention is to provide a mechanism of the above described character which is comparatively inexpensive, simple and durable in construction, accurate and dependable in operation, and which is easily regulated to vary the volume of water flow from the outlet with which it is associated.

With these and other objects in view, only one form of the invention will be described, and its novel features pointed out in claims.

In the accompanying drawing,

Figure 1 is a vertical central sectional view of the flow control mechanism applied to an outlet of an irrigating system;

Figure 2 is a fragmentary view of the flow control mechanism in side elevation;

Figures 3 and 4 are horizontal sectional views taken, respectively, on the lines 3—3 and 4—4 of Figure 1;

Figure 5 is a fragmentary detail sectional view taken on the line 5—5 of Figure 1.

Referring specifically to the drawing, the invention is shown associated with one of a multiplicity of outlets of an irrigating system having overhead sprinklers and including a main water pipe 10 leading from the pressure side of the pump (not shown) and laid on the ground to follow the contour thereof, or buried in the ground as desired. At predetermined intervals, the pipe 10 is provided with outlets, each in the form of a vertical branch pipe 11 on the upper end of which is secured a nipple 12.

Threadedly secured to the nipple 12 and co-axially related to the pipe 11 is a relatively large and stationary tubular section 13 telescopically receiving a rotary tubular inlet section 14 of a sprinkler head H. The upper end of the section 14 is closed by a cap 15 from which radially project sprinkler pipes 16—16 having sprinkler heads 17—17 at their angularly projecting outer ends.

Also threaded into the nipple 12 and co-axially related to the section 13 is a metering tube 18 the upper end portion of which projects freely into the rotary section 14 and is embraced by a packing ring 19 confined against an annular shoulder 20 in the section 14, by a ring nut 21 freely receiving the tube 18 and threaded into the section 14, whereby to provide a watertight seal between the tube 18 and section 14, yet permit rotation of the latter.

Fixed in the rotary section 14 in any suitable manner is an impeller 22 in the form of a cylindrical body, the periphery of which is provided with one or more helical grooves 23 opening to the ends of the body and decreasing in width as well as in pitch from the lower or inlet end of the body to its upper or outlet end. The upper wall of the grooves 23 is concave in cross section, as indicated at 24 in Figure 5, and the grooves co-act with the internal annular wall of the section 14 to define helical water channels C so that water from the tube 18 impinging against the walls of the grooves will tend to displace the sprinkler head H axially upward, and to effect rotation of the head.

From the lower end of the impeller 22 projects co-axially therewith a conical valving element 25. The upper end of the tube 18 which is beveled to form a valve seat 26 is adapted to co-act with the element 25 to vary the flow of water from the tube 18 as the sprinkler head H is moved axially downward from the extreme position shown in Figure 1, wherein a maximum flow of water from the tube is permitted. The axial position of the sprinkler head is under the control of an actuating mechanism which functions in a manner to be later described. This actuating mechanism is composed of a pair of arms 27—27 having adjustable weights 28—28 and being pivotally mounted adjacent one end at 29 between pairs of ears 30—30 of an annulus 31 constructed in two sections clamped together by bolts 32.

The annulus 31 is clamped on the outer race of an anti-friction bearing 33, the inner race of which is fixed to the stationary section 13, whereby to mount the annulus for rotation. Pivoted at 34 to the upper ends of the arms 27 are the lower ends of adjustable links 35 in the form of externally threaded rods on which are nuts 36 and 37 disposed at opposite ends of sleeves 38 through which the links freely extend. The sleeves are provided with bosses 39 through which extend pins 40 to pivotally connect the links 35 to ears 41 on a bracket 42 constructed in two sections secured together by bolts 43 which clamp the bracket to the rotary section 14. It will thus be clear that rotational movement imparted to the sprinkler head H by the impeller 22 will effect rotation of the annulus 31, arms 27, and links 35 as a unit. It will be noted that the weights 28 maintain the arms in the vertical position shown, in the absence of water pressure in the line 10, so as to hold the sprinkler head H in its uppermost extreme position wherein the valving element 25 permits the maximum flow of water from the tube 18.

The operation of the invention is as follows:

Let it be assumed that water is being delivered to the main pipe 10 at a pump pressure sufficient to provide a predetermined minimum pressure at that outlet most distant from the pump. It is to be understood that a flow control mechanism as above described is provided at each outlet, and that the weights 28 and valving element 25 of each mechanism are adjusted to obtain the discharge of a predetermined quantity of water from the respective sprinkler heads H under the pressure available at the respective outlets.

Considering any one outlet, the water discharging from the metering tube 18 will be converted into an annular stream by the conical valving element 25, and delivered to the water channels C so as to impinge against the helical surfaces of the grooves 23 and effect rotation of the sprinkler head and the arms 27 as a unit.

In accordance with the speed of rotation of the sprinkler head, which is dependent on the pressure of water acting upon the impeller 22, the arms will be swung outwardly about their respective axes 29 by centrifugal force so as to co-act with the links 35 in moving the sprinkler head axially downward as it rotates, to thus reduce the effective size of the tube 18 until the predetermined minimum quantity of water for which the mechanism has been adjusted is being discharged.

It will be clear that according as the water pressure increases or decreases for any reason, closing or opening movement of the valving element 25 will be effected automatically to such extent as to constantly maintain a uniform volume of flow from the sprinkler head. Thus, should the water pressure increase, the speed of rotation of the sprinkler head will be proportionately increased so as to proportionately reduce the effective opening of the tube 18 by the valving element 25 sufficiently to compensate for the increased velocity of the water. Conversely, should the water pressure decrease, the speed of rotation of the sprinkler head will be decreased, so as to proportionately increase the effective opening of the tube 18 by the valving element.

It will also be clear that by adjusting the nuts 36 and 37 on the links 35 so as to shift the sleeves 38 thereon, the initial position of the sprinkler head, and hence of the valving element 25 axially with respect to the seat 26 will be varied in order to regulate the mechanism to discharge water from the sprinkler head in any predetermined quantity up to a maximum, irrespective of the water pressure at the head.

In order to prevent retardation of the axial movement of the section 14 by air between the section 13 and tube 18, an air port 44 is provided in the section 13.

What is claimed is:

1. In an overhead irrigating system, an outlet adapted for connection to a source of water under pressure; a sprinkler head; means mounting said head co-axially of said outlet for rotation and axial movement in water sealed connection to the outlet so as to receive water therefrom; a valving element carried by said head and co-actable with said outlet to vary the effective size of the latter in response to axial movement of the head; an impeller operatively associated with said head to respond to the pressure of water at said outlet, by effecting rotation of the head and moving the latter axially in a direction for the valving element to increase the effective size of the outlet; and means operatively connected to said head, and responsive to centrifugal force generated by rotation of the head, to move the latter axially in a direction for the valving element to decrease the effective size of the outlet.

2. In an overhead irrigating system, an outlet adapted for connection to a source of water under pressure; a sprinkler head; means mounting said head co-axially of said outlet for rotation and axial movement in water sealed connection to the outlet so as to receive water therefrom; a valving element carried by said head and co-actable with said outlet to vary the effective size of the latter in response to axial movement of the head; an impeller operatively associated with said head to respond to the pressure of water at said outlet, by effecting rotation of the head and moving the latter axially in a direction for the valving element to increase the effective size of the outlet; means operatively connected to said head, and responsive to centrifugal force generated by rotation of the head, to move the latter axially in a direction for the valving element to decrease the effective size of the outlet; and means by which the last means can be adjusted to vary the maximum open position of the valving element.

3. In an overhead irrigating system, an outlet adapted for connection to a source of water under pressure; a sprinkler head including a tubular inlet section; means co-acting with said section to mount the latter co-axially of the outlet for rotational and axial movements in water sealed connection to the outlet so as to receive water therefrom; a valving element carried by said section, and co-actable with said outlet to vary the effective size of the latter in response to axial movement of the inlet section; an impeller in said section operable by water discharging from said outlet, to rotate the sprinkler head and move the latter axially in a direction for the valving element to increase the effective size of the outlet; and means operatively connected to said head, and responsive to centrifugal force, to move the head axially in a direction to decrease the effective size of the outlet.

4. In an overhead irrigating system, an outlet adapted for connection to a source of water under pressure; a sprinkler head including a tubular inlet section; means co-acting with said section to mount the latter co-axially of the outlet for rotational and axial movements in water sealed connection to the outlet so as to receive water therefrom; a valving element carried by said section, and co-actable with said outlet to vary the effective size of the latter in response to axial movement of the inlet section; an impeller in said section operable by water discharging from said outlet, to rotate the sprinkler head and move the latter axially in a direction for the valving element to increase the effective size of the outlet; weighted members mounted to revolve about the axis of said section, and to move relatively thereto under the action of centrifugal force; and links pivotally connected to said section and to the weighted members, to be operated thereby and move the head axially in a direction to decrease the effective size of the outlet.

5. In an overhead irrigating system, an outlet adapted for connection to a source of water under pressure; a sprinkler head including a tubular inlet section; means co-acting with said section to mount the latter co-axially of the outlet for rotational and axial movements in water sealed connection to the outlet so as to receive water therefrom; a valving element carried by said section, and co-actable with said outlet to vary the effective size of the latter in response to axial movement of the inlet section; an impeller in said section operable by water discharging from said outlet, to rotate the sprinkler head and move the latter axially in a direction for the valving element to increase the effective size of the outlet; weighted members mounted to revolve about the axis of said section, and to move relatively thereto under the action of centrifugal force; links pivotally connected to said section and to the weighted members, to be operated thereby and move the head axially in a direction to decrease the effective size of the outlet; and means by which the effective length of the links can be varied, to vary the maximum open position of said valving element.

6. In an overhead irrigating system, an outlet pipe including a metering tube having a valve seat; a sprinkler head including a tubular inlet section; a second tubular section supported by the outlet pipe co-axially therewith, and telescopically associated with the inlet section to mount the latter for rotational and axial movements; means providing a water sealing connection between the metering tube and inlet section; a valving element carried by said inlet section and co-actable with said valve seat; an impeller in the inlet section, operable by water discharging from the metering tube, to rotate the sprinkler head and to move the latter axially in a direction for the valving element to move away from the valve seat; and means operatively connected to said head, and responsive to centrifugal force, to move the head axially in a direction for the valving element to be moved toward the valve seat.

7. In an overhead irrigating system, an outlet pipe including a metering tube having a valve seat; a sprinkler head including a tubular inlet section; a second tubular section supported by the outlet pipe co-axially therewith, and telescopically associated with the inlet section to mount the latter for rotational and axial movements; means providing a water sealing connection between the metering tube and inlet section; a valving element carried by said inlet section and co-actable with said valve seat; an impeller in the inlet section, operable by water discharging from the metering tube, to rotate the sprinkler head and to move the latter axially in a direction for the valving element to move away from the valve seat; weighted arms revolubly mounted on the second said section for pivotal movement in response to the action of centrifugal force; and links pivotally connected to the arms and to said inlet section, to be operated by the arms so as to move the sprinkler head axially in a direction for the valving element to be moved towards the valve seat.

8. In an overhead irrigating system, a vertical outlet pipe adapted for connection to a source of water under pressure; a sprinkler head having a tubular inlet section rotatably mounted and axially movable on the outlet pipe; an impeller in said inlet section, against which water from the outlet pipe impinges to rotate the sprinkler head and tend to move the latter axially in one direction; means operable in response to centrifugal force generated by rotation of the sprinkler head to tend to move the latter axially in the opposite direction; and valve means co-acting with the impeller and last said means to maintain a uniform volume of water flow from the outlet pipe.

9. In an overhead irrigating system, a vertical outlet pipe adapted for connection to a source of water under pressure; a sprinkler head having a tubular inlet section rotatably mounted and axially movable on the outlet pipe; an impeller in said inlet section, against which water from the outlet pipe impinges to rotate the sprinkler head and tend to move the latter axially in one direction; means operable in response to centrifugal force generated by rotation of the sprinkler head to tend to move the latter axially in the opposite direction; a valve seat supported by the outlet pipe; and a valving element carried by the inlet section and co-operable with said seat.

10. In an overhead irrigating system, a vertical outlet pipe adapted for connection to a source of water under pressure; a sprinkler head having a tubular inlet section rotatably mounted and axially movable on the outlet pipe; an impeller in said inlet section having helical grooves co-acting with the internal wall of the inlet section to define helical water channels by which water from the outlet pipe is caused to rotate the sprinkler head and to tend to move the latter axially in one direction; means co-acting with the sprinkler head under the action of centrifugal force generated by rotation of the sprinkler head to tend to move the latter axially in the opposite direction; a valve seat supported by the outlet pipe; and a valving element carried by the impeller and co-operable with said seat.

11. In a fluid supply system, an outlet adapted for connection to a source of fluid under pressure; a fluid discharge head; means mounting said head co-axially of said outlet for rotation and axial movement in water sealed connection to the outlet so as to receive water therefrom; a valving element carried by said head and co-actable with said outlet to vary the effective size of the latter in response to axial movement of the head; an impeller fixed to rotate with said head and against which water impinges to effect rotation of the head and move same axially in a direction for the valving element to increase the effective size of the outlet; and means operatively connected to said head, and responsive to centrifugal force generated by rotation of the head, to move the latter axially in a direction for the valving element to decrease the effective size of the outlet.

FRIDOLIN BRAUNGART.